Oct. 16, 1934.  S. ESKIN  1,976,842

TEMPERATURE CONTROL DEVICE

Filed July 7, 1932

Inventor:
Samuel Eskin,
by Chas. E. Muller
His Attorney.

Patented Oct. 16, 1934

1,976,842

UNITED STATES PATENT OFFICE 1,976,842

TEMPERATURE CONTROL DEVICE

Samuel Eskin, Roxbury, Mass., assignor to Edison General Electric Appliance Company, Incorporated, Chicago, Ill., a corporation of New York Application July 7, 1932, Serial No. 621,207

12 Claims. (Cl. 200—138)

My invention relates to temperature control devices, more particularly to devices for controlling an electric circuit in accordance with temperature changes, and has for its object the provision of an improved device of this character.

In general, my invention relates to temperature responsive devices such as described and claimed in United States reissue patent to A. Lewerenz, No. 16,654, dated June 14, 1927, and in United States patent to A. H. Simmons, No. 1,743,073, dated January 7, 1930, which is an improvement of the Lewerenz device. More specifically, my invention relates to improvements in one form of temperature control device described and claimed in a co-pending application of Francis H. McCormick, Serial No. 575,593, filed November 17, 1931, and assigned to the same assignee as this invention. The temperature control devices disclosed in these patents and in this application comprise a bimetallic thermostat bar fixed at one end and having its other end free to move in response to changes in temperature. These movements of the bimetallic bar are utilized to control a switch arm or other suitable control member. Bearing on the movable end of the bimetallic bar is an elastic member arranged to cause the bar to move quickly from one position to another and thereby give the switch a snap action in opening and closing the circuit which it controls.

My invention contemplates a new organization in a control device of the type including the provision of improved means for adjusting the temperature setting by adjusting the position of the elastic member which bears on the movable end of the bimetallic bar. One means for effecting this adjustment is described and claimed in the above-mentioned McCormick patent application. My invention is in the nature of an improvement of the adjusting means disclosed in the McCormick application, and I, therefore, do not herein claim anything shown or described in the said McCormick application.

In accordance with my invention, the elastic member which bears on the thermostat bar to cause it to move quickly from one position to another is supported by a resilient member which by reason of its elasticity normally tends to move the elastic member in a predetermined direction, preferably in the plane of movement of the bimetallic bar. Movement of the resilient member is controlled by means of a stop which is adjustable so that the temperature setting of the thermostat can be adjusted.

Figure 1:
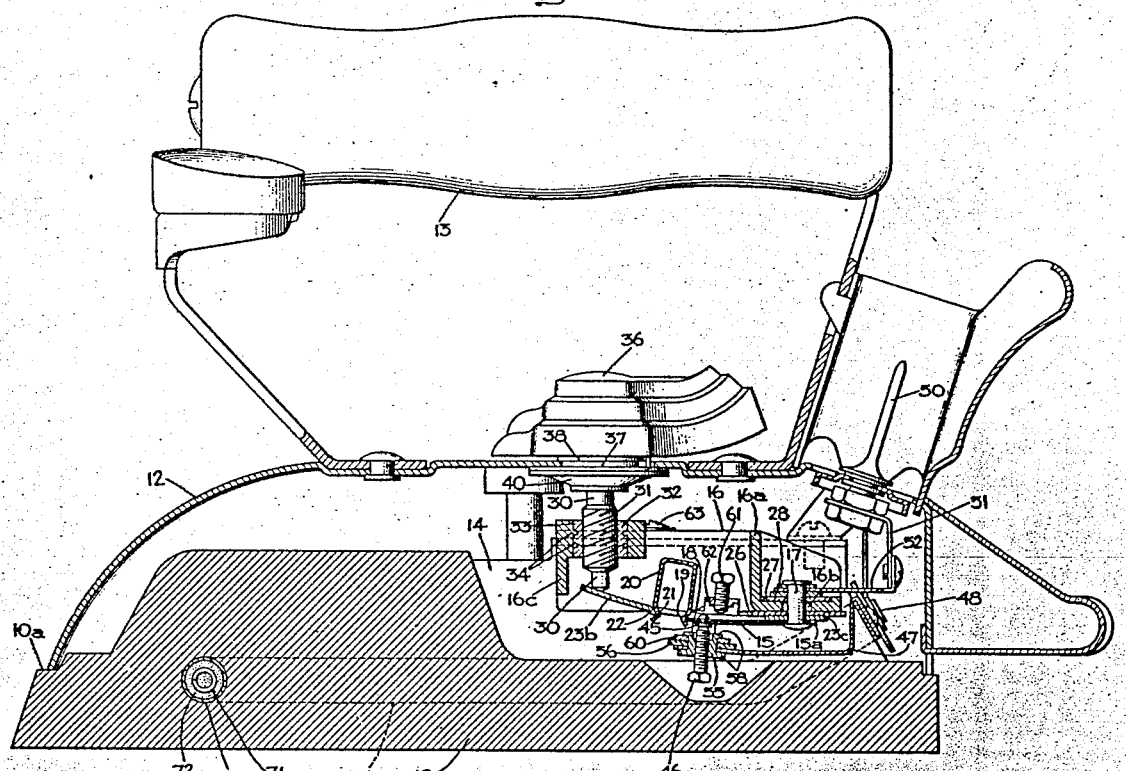
Figure 2:
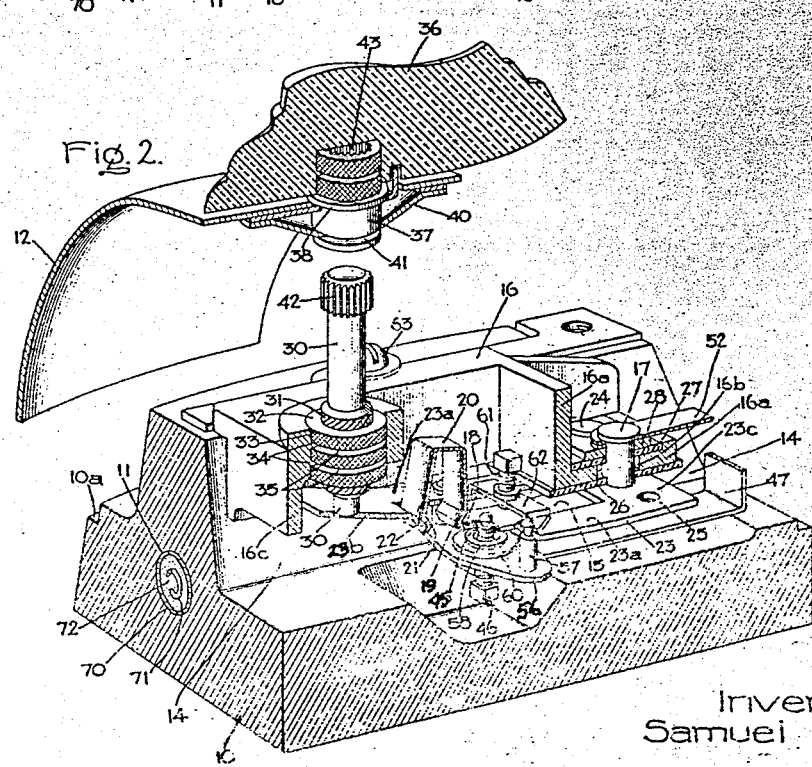

For a more complete understanding of my invention, reference should be had to the accompanying drawing in which Fig. 1 is a vertical sectional view of an electric flatiron provided with a temperature control device embodying my invention; and Fig. 2 is a perspective view of a portion of the flatiron of Fig. 1.

Referring to the drawing, I have shown my invention in one form as applied to an electric flatiron comprising a comparatively heavy body member 10 made of a suitable heat conducting material, such as cast iron, and within which is cast a suitable electric heating unit 11. As shown, the upper portion of the body member 10 is enclosed by a cover 12 normally resting on a shoulder 10a provided for it in the body member 10, the cover member 12 being suitably secured to the body member 10 by means of screws (not shown).

Attached to the cover of the iron 12 is a suitable handle 13 which may be grasped by the attendant to operate the iron.

In the upper portion of the body member 10 is a recess 14 in which is secured a temperature responsive control device for the heating element 11 arranged in accordance with my invention. The temperature control device comprises a suitable thermostat, shown as a bimetallic bar 15 made of two strips of metal having dissimilar temperature coefficients of expansion, such as brass and steel, the strips being securely brazed or welded together lengthwise.

The thermostat bar 15 is rigidly secured at one end to a portion 16a of a frame 16, which portion extends transversely of the recess 14, as clearly shown in the drawing. The thermostat bar may be, and as shown, is secured to the frame portion 16a by means of a clamping member 17 passed through apertures 15a and 16b provided for it in the thermostat and in the frame portion 16a respectively. It will be observed that the thermostat bar is supported within the lower portion of the recess 14 in close thermal relation with the working surface of the iron.

It will also be observed that the unsecured end of the thermostat can move freely in response to changes in temperature. This movable end of the thermostat bar is provided with a knife edge bearing 18, which rests in a bearing seat 19 provided for it in one arm of an inverted U-shaped resilient member or spring 20. The other arm of this spring member is provided with a seat 21 which rests on a knife edge bearing 22. The seats for the knife edge bearing 18 and 22 may be and as shown are provided by striking V-shaped indentations in the ends of the two arms of the spring member 20, as clearly shown in the drawing.

The knife edge bearing 22 is supported by a resilient member 23. This member, as shown, is rectangular in shape, having two parallel side portions 23a joined by a pair of end portions 23b and 23c. The bearing support 23 is supported substantially in the general plane containing the thermostat bar 15 by means of the frame portion 16a. As shown, the right-hand end portion 23c of the member 23, as viewed in the figures, is sandwiched between the thermostat bar and the frame portion 16a and hence is secured by means of the clamping member 17. Preferably, a pair of additional clamping members 24 (only one of which is shown) similar to the member 17 will be provided to secure the member 23 to the frame, suitable apertures 25 being provided for these clamping members in the resilient member 23 and likewise suitable apertures (not shown) being provided for them in the frame. The member 23 is electrically insulated from the frame 16 by an insulating sheet 26 formed from a suitable electrically insulating material, such as mica. Arranged on the upper surface of the frame portion 16a is another similar sheet 27 of insulating material and over this sheet is arranged a clamping plate 28 which is secured by the clamping members 17 and 24. The apertures provided in the frame portion 16a to receive the clamping members 17 and 24 are enlarged somewhat so that these members are electrically insulated from the frame 16.

The rectangular resilient member 23, as shown, substantially embraces the thermostat bar 15, the side portions 23a of the member being spaced laterally from the corresponding edges of the bar, and the end portion 23b of the member being spaced a sufficient distance from the free end of the thermostat to accommodate the U-shaped spring member 20.

The bearing 22 provided on the end portion 23b supporting the spring 20 is bent or otherwise formed to incline downwardly from the body of the member, as clearly shown in the drawing.

The resilient member 23 is arranged to bias the free end portion 23b upwardly in the plane of movement of the thermostat bar 15 by the inherent resiliency of the bar. This portion 23b bears against a suitable stop 30 which is adjustable so that the position of this portion and hence of the knife edge bearing 22 can be adjusted.

The stop 30, as shown, is provided with a threaded portion 31 of somewhat enlarged diameter that is threaded in a frame insert 32. This insert is received in an aperture 33 provided for it in a portion 16c of the frame 16 extending transversely of the recess 14. The frame insert is provided with a plurality of spaced ribs 34 projecting inwardly from the walls defining the aperture 33 and received in spaced recesses 35 provided for them in the insert 32. These ribs function to support both the insert 32 and the adjustable stop 30 threaded in the insert.

The stop 30 is adjusted by means of a knob or handle 36 which is shown as accessible at the exterior of the iron. The knob 36 is secured to and has a driving connection with a cylindrical member 37 which in turn has a driving connection with the adjusting screw or member 30. The member 37 is provided with a flange 38 which rests on the top surface of the iron cover 12. The outer walls of the cylindrical member 37 above the flange are knurled, as shown, and with this knurled portion the knob 36 has a driving fit. The lower portion of this cylindrical member 37 projects through the cover. This protruding portion is secured to the inner surface of the cover 12 by means of a washer 40. This washer as shown has a conical shape; the base of the washer is secured to the inner surface of the upper wall of the cover 12, while the apex of the conical washer terminates in an aperture, the walls defining the aperture being received in a recess 41 provided for them in the lower portion of the cylindrical member 37. It will be observed that by reason of this arrangement, the member 37 is secured by the washer 40 and the flange 38 which rests on the upper wall portion of the cover 12 of the iron.

The adjusting screw 30 is provided at its upper end with a chamfered or fluted portion 42 which is arranged to be received in channels 43 provided in the upper portion of the cylindrical member 37, that is, in the portion which projects from the cover 12, whereby a driving connection is effected between the handle 36 and the rod 30.

The bearing 22 carried by the resilient member 23 lies in the plane of movement of the bimetallic bar 15 in such a position that at a predetermined temperature the knife edge bearing 18 of the bar 15 will lie in a line passing through the bearing 22 to the point of support of the bar 15. This is the "neutral" position of the thermostat bar.

It will be observed that the arms of the resilient spring member 20 tend to separate by reason of the resiliency of the member, these arms being compressed between the bearings 18 and 22, whereby the member 20 exerts a force on the movable end of the thermostat, which force tends to hold the movable end on one side or the other of the neutral position. Obviously in the neutral position, the entire force exerted by the spring member is in the direction of the point of support of the thermostat. In other words, the force exerted by the spring member in the neutral position is lengthwise of the thermostat, the lateral component of this force being zero. However, when the thermostat moves from the neutral position in either direction. a lateral component of this spring pressure is produced tending to force the thermostat away from the neutral position. This action of the spring member 20 causes the thermostat bar 15 to move quickly with a snap action to its positions on opposite sides of the neutral position.

The electrical circuit for the heating element 11 of the iron includes the thermostat bar 15. As shown, the thermostat bar carries at its free end a suitable switch contact 45 that cooperates with an adjustable fixed contact member 46 which is electrically connected by means of a lead member 47 with the one of the terminals 48 of the heating element 11. The opposite terminal (not shown) of this heating element is secured to one of a pair of terminal pins 50, the other terminal pin of which is secured by means of a suitable lead 51 and connection member 52 with the clamping member 17, which as has been pointed out previously, is in electrical contact with the thermostat bar, but is insulated from the body 10 of the iron. It will be observed that by reason of these connections the thermostat bar 15 is connected in series with the heating circuit of the iron 10.

The fixed contact 46 is supported by means of the resilient member 23. As shown, the contact 46 is threaded through a suitable collar 55 which is supported by means of a suitable plate 56 extending transversely of the iron and supported at its opposite ends by means of a pair of clamps 57 secured to and depending from the side portions 23a of the resilient member. The plate 56 is formed from some suitable electrically insulating material, such as mica, and hence the fixed contact 46 is electrically insulated from its supporting structure. The member 55 is provided at its upper and lower ends with head portions 58 which clamp the lead member 47 and the insulating sheet 56 between them. Preferably, a washer 60 will be interposed between the upper head and the member 56.

The resilient member 23 also serves to support a suitable stop member 61 for the thermostatic blade when it is in its open circuit position. As shown, this stop comprises a stud-like member threaded in a bridge or supporting member 62 which extends transversely across the thermostatic blade and is secured at its opposite ends to the side portions 23a of the member 23 by means of the clamping members 57. It will be observed that the stop member 61 is adjustable in its supporting bridge 62.

While the frame 16 may be formed integrally with the body 10 of the iron, it is preferable that this member be formed as a separate member so that the frame, together with the elements constituting the control device and supported by the frame, can be removed as a unitary structure. The detachable frame may be secured to the body 10 by means of studs threaded on the body, the heads 63 of these studs overlapping the adjacent edges of the frame.

In the operation of my temperature control device, it will be understood that the movable contact 45 will be held downward by the spring 20 to maintain the heating circuit of the iron closed as long as the temperature is below a predetermined maximum value. Under these conditions, the movable end of the thermostat is situated below the neutral position. As the temperature increases, the distortion of the thermostat tends to move its free end upward, but this movement is resisted by the resilient member 20. Upon the occurrence of the predetermined maximum temperature, however, the thermostat has sufficient force to overcome the spring 20 and starts to move upward. As the thermostat moves upward, the opposing force exerted by the spring 20 decreases, since the spring 20 exerts its force more nearly in the direction of the line of support of the thermostat. The thermostat 15, therefore, rapidly accelerates and moves at a high speed through the neutral position to the opposite side thereof, where it is urged rapidly upwardly by the increasing lateral component of the force applied by the spring 20. The heating circuit is thus quickly opened, the movable contact 45 being thrown upward with a snap action to its open circuit position. When the thermostat is in its open circuit position, the movable contact 45 comes to rest against the stop 61. After the heating circuit has been opened and the temperature of the iron and consequently that of the thermostat begins to decrease, the distortion of the thermostat tends to move it back to its closed circuit position, but this movement is opposed by the force exerted by the spring member 20, this force being overcome at some predetermined minimum temperature when the thermostat 15 will snap to its closed circuit position. In this manner, the heating circuit is controlled so as to maintain a predetermined temperature which is a mean between the maximum and minimum temperatures for which the device is set to operate.

The device can be set to maintain a desired predetermined temperature by means of the adjustment rod 30. It will be observed that when the knob 36 is rotated, the position of the spring member 23 and hence the position of the knife edge bearing 22 is changed. This obviously changes the position of the neutral line which passes between the knife edge bearing 22 and the point of support of the fixed end of the bimetallic bar 15. It will be obvious that by changing the position of this neutral line, the temperature at which the thermostat will snap from one position to the other will be changed, and consequently, the temperature setting of the iron will be changed. To set the device to maintain a higher temperature, the knob 36 will be turned so as to move the knife edge support 20 downwardly, as viewed in the figure. Adjustment of the knob in the opposite direction will decrease the temperature that will be maintained by the thermostat.

Although any suitable heating unit 11 may be used, preferably a heating unit will be used of the type described and claimed in United States Patent No. 1,367,341 to C. C. Abbott, dated February 1, 1921. Briefly, this unit comprises an outer metallic sheath 70, suitably shaped, in which a helical heating resistor 71 is embedded in a powdered heat refractory insulating material 72. The heating unit 11 is shaped roughly in the form of a horseshoe, its terminals brought out at the rear of the iron as shown.

It will be observed that I have provided a temperature control device which is extremely simple, inexpensive and rugged in its construction. Moreover, it is quite convenient and easy to operate the thermostat. To adjust its temperature setting it is merely necessary to move the control knob 36 which adjusts the position of the bearing 22 for the spring member 20.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is—

1. A temperature control device comprising a thermostat, an elastic member associated with said thermostat so as to cause said thermostat to move quickly from one position to another, a bearing for said elastic member, a resilient member biasing said bearing in one direction in the plane of movement of said thermostat and means for changing the position of said resilient member so as to adjust the temperature setting of said device to maintain a preselected temperature.

2. A temperature control device comprising a thermostat, an elastic member bearing on said thermostat arranged to cause said thermostat to move quickly from one position to another, a bearing for said elastic member, a resilient member supporting said bearing and means for adjusting the position of said resilient member, in the plane of movement of said thermostat so as to vary the temperature setting of said device to maintain a preselected temperature.

3. A temperature control device comprising a thermostat bar having one end fixed and its other end free to move in response to changes in temperature, an elastic member having one end bearing on the movable end of said bar and movable with said bar in the plane of movement thereof, so as to cause said bar to move quickly from one position to another, a resilient support for the other end of said elastic member tending to move said end in a predetermined direction in the plane of movement of said bar and an adjustable stop member for said resilient member for adjusting its position so as to change the temperature setting of said device to maintain a predetermined temperature.

4. A temperature control device comprising a bimetallic thermostat bar having one end free to move in response to changes in temperature, a resilient member having a portion thereof adjacent said free end, said member by reason of its elasticity tending to bias said portion in a predetermined direction in the plane of movement of said thermostat bar, an elastic member having one end supported by said portion of said resilient member adjacent the free end of said bar and its other end bearing on said free end so that said elastic member moves with said free end in the plane of movement of said bar and an adjustable member cooperating with said portion of said resilient member adjacent said free end of said thermostat bar to change its position in the plane of movement of said bar and thereby the position of said elastic member in said plane of movement so as to adjust the temperature setting of said control device to maintain a selected temperature.

5. A temperature control device comprising a body member, a bimetallic thermostat bar having one end fixed to said body member and having its other end free to move in response to changes in temperature, a resilient member having resilient portions on opposite sides of said bar secured to said body member adjacent the secured end of said thermostat bar, said portions tending to move in a predetermined direction, and a third portion connecting the other ends of said first-mentioned portions, said third portion having a bearing seat adjacent said movable end of said thermostat bar, a spring interposed between said third portion and said free end, said spring resting on said bearing seat and said free end so as to exert a force on said free end tending to retard the initial movement of said bar from one position to another and thereafter to quickly move said bar to said other position, an adjustable stop member bearing on said third portion and means for adjusting the position of said stop.

6. A temperature control device comprising a thermostat, a bearing, a U-shaped spring member having one arm seated on said bearing and its other arm seated on said thermostat so as to cause said thermostat to move quickly from one position to another, resilient arms supporting said bearing and tending to move it so as to change the temperature setting of said thermostat, and an adjustable stop for said bearing.

7. A temperature control device comprising a thermostat bar having one end fixed and its other end free to move in response to changes in temperature, a resilient member in substantially the plane of said bar and embracing said bar, said resilient member tending to move in one direction in the plane of movement of said bar, an elastic member bearing on a portion of said resilient member and on the free end of said bar so as to cause said bar to move quickly from one position to another, a stop member for said resilient member to prevent its movement by its bias in said one direction and means for adjusting the position of said stop to change the setting of said thermostat.

8. A temperature control device comprising a thermostat bar having one of its ends fixed and its other end free to move in response to temperature changes, a resilient member having a U-shaped portion embracing said bar and tending to move in one direction in the plane of movement of said bar and a U-shaped elastic member interposed between the base of said first U-shaped member and the free end of said thermostat bar.

9. A temperature control device comprising a body member, a thermostat bar having one end fixed to said body member and its other end free to move in response to changes in temperature, a substantially rectangular resilient member embracing said bar and having its end adjacent the fixed end of said bar secured to said body member and its other end free to move in the plane of movement of said bar, said resilient member tending to move its free end in a predetermined direction in said plane of movement, and a substantially U-shaped spring member having its arms bearing on the free ends of said resilient member and said thermostat bar respectively and means for adjusting the position of said resilient member.

10. A temperature control device comprising a substantially rectangular resilient member having one end fixed and its other end free to move in a direction at right angles to the general plane of said member, a thermostat bar embraced by said rectangular member and having one end secured at the fixed end of said resilient member and its other end free to move in the plane of movement of said resilient member in response to temperature changes, a spring having one end bearing on the free end of said resilient member and its other end bearing on the free end of said thermostat bar, means for adjusting the position of the free end of said resilient member, means arranged to connect the fixed end of said thermostat bar to the circuit to be controlled, a contact carried by the free end of said bar, a fixed contact carried by said resilient member cooperating with said contact and means arranged to connect said fixed contact in said circuit.

11. A temperature control device comprising a thermostat, an elastic member bearing on said thermostat arranged to cause it to move quickly from one position to another, a bearing for said elastic member, a resilient member supporting said bearing, means for adjusting the position of said resilient member so as to vary the temperature setting of said device to maintain a preselected temperature, a switch contact carried by said thermostat and a cooperating switch contact carried by said resilient member.

12. A temperature control device comprising a thermostat, an elastic member bearing on said thermostat arranged to cause it to move quickly from one controlling position to another, a bearing for said elastic member, a resilient member supporting said bearing and biasing it in one direction, means for adjusting the position of said resilient member so as to vary the temperature setting of said device to maintain a preselected temperature and a stop member carried by said resilient member defining one of said controlling positions.

SAMUEL ESKIN.